United States Patent [19]

Hansen, Jr.

[11] 4,173,110

[45] Nov. 6, 1979

[54] SELF-ACTING IMPLEMENT

[76] Inventor: Bobbie F. Hansen, Jr., 5393 N. Rolinda, Fresno, Calif. 93705

[21] Appl. No.: 867,439

[22] Filed: Jan. 6, 1978

[51] Int. Cl.² ............................................. A01D 45/10
[52] U.S. Cl. ..................................... 56/10.2; 56/10.4; 56/11.9; 56/15.5; 56/63; 56/235; 56/DIG. 15
[58] Field of Search ...................... 56/15.5, 10.2, 10.4, 56/11.1, 11.9, 233, 234, 235, 237, 330, 331, 63

[56] References Cited

U.S. PATENT DOCUMENTS

| 2,579,862 | 12/1951 | Richardson | 56/237 |
| 3,462,925 | 8/1969 | Lanier | 56/11.9 |
| 3,918,240 | 11/1975 | Haffner et al. | 56/11.9 |

FOREIGN PATENT DOCUMENTS 1510463  5/1974  United Kingdom ..................... 56/235

Primary Examiner—Jay N. Eskovitz
Attorney, Agent, or Firm—Huebner & Worrel

[57] ABSTRACT

An implement for cutting canes, foliage and the like of a row crop, the implement having a frame adapted to be mounted on a vehicle, such as a tractor having a tool bar movable to and from a lowered position, for movement with the vehicle along a path of travel substantially parallel to the row crop; a cutting head mounted on the frame for movement to and from an extended cutting position; a mechanism borne by the frame for moving the cutting head to and from the extended cutting position; and a control system operably interconnecting the tool bar and the mechanism for moving the cutting head to the extended cutting position when the tool bar of the tractor is moved to the lowered position.

10 Claims, 5 Drawing Figures

SELF-ACTING IMPLEMENT

BACKGROUND OF THE INVENTION

1. Field of the Invention

The present invention relates to an implement and more particularly to an implement which is adapted to be borne by a vehicle, such as a tractor, in earth traversing movement and to be extended and alternately retracted during the performance of the work operation in response to a predetermined stimulus requiring minimal supervision by the operator and to such an implement in which the work performing portions thereof are activated only upon reaching predefined work performing positions.

2. Description of the Prior Art

It is frequently necessary in farming to perform a variety of work operations with respect to the crops which are inherently dangerous, but are nonetheless essential to a productive and efficient farming operation. For example, it is periodically necessary in the farming of vine borne crops such as grapes to sever the lowermost canes and foliage of the vines for proper conditioning and so the canes will not become entangled in other equipment which might damage both the vines and the equipment. Cane cutters borne by tractors are employed for this purpose and operate to sever the canes on the opposite sides of each row a distance of approximately one to two feet above the earth's surface. Such cane cutters are passed at the desired elevation along the ground along horizontal paths of travel throughout the length of the row. During such travel and particularly upon entry to and exit from each row, the cutters must be carefully maneuvered so as to avoid inadvertent injurious contact with other portions of the vines and other objects in the vicinity. Caution must also be exercised to avoid injury to passersby either by contact with the cutting blade itself or by fragments of material thrown by the cutting blade.

Because of the inherent danger in the use of cane cutters, it has been, in most instances, inappropriate to perform other work operations, such as cultivating, during the use of the cutters even where both operations could otherwise be performed at the same time. This requires either the expenditure of considerably more time to perform both operations than would be desirable, or disregard for the risks inherent in simultaneous performance of these operations.

In any case, these problems have, in the past, interferred with the efficient use of the equipment and created a risk of injury of the type to which recent industrial and agricultural safety legislation has been directed.

Therefore, it has long been known that it would be desirable to have an implement which operates efficiently and dependably to perform its work operation with minimal supervision while minimizing the risk of injury to field workers, crops and other objects in the vicinity and which permits several work operations to be performed simultaneously with little or no additional supervision.

SUMMARY OF THE INVENTION

Therefore, it is an object of the present invention to provide a self-acting implement which is adaptable to a wide variety of embodiments for the performance of a wide variety of work operations such as the cutting of the canes of vine borne crops.

Another object is to provide such an implement which, in any specific embodiment, is capable of being mounted on virtually any vehicle for earth traversing movement.

Another object is to provide such an implement which is well suited for use in the cutting of the canes of vine borne crops trained in rows to facilitate the unimpeded passage of other equipment along the rows.

Another object is to provide such an implement which can be linked to the tool bar of a tractor and possesses a hydraulic control system which maintains the work performing portions of the implement in retracted protective positions when the tool bar is in a raised attitude and which extends those portions to work performing positions only upon lowering of the tool bar.

Another object is to provide such an implement in which the hydraulic control system precludes operation of the work performing portions of the implement until those portions have been extended to their respective work performing positions.

Another object is to provide such an implement which minimizes the likelihood of injury to field workers, crops and other objects in the vicinity either by direct contact with the work performing portions or by fragments of material thrown by the work performing portions.

Another object is to provide such an implement which requires no control by the operator of the vehicle on which the implement is mounted other than maneuvering of the vehicle along the row.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 1:
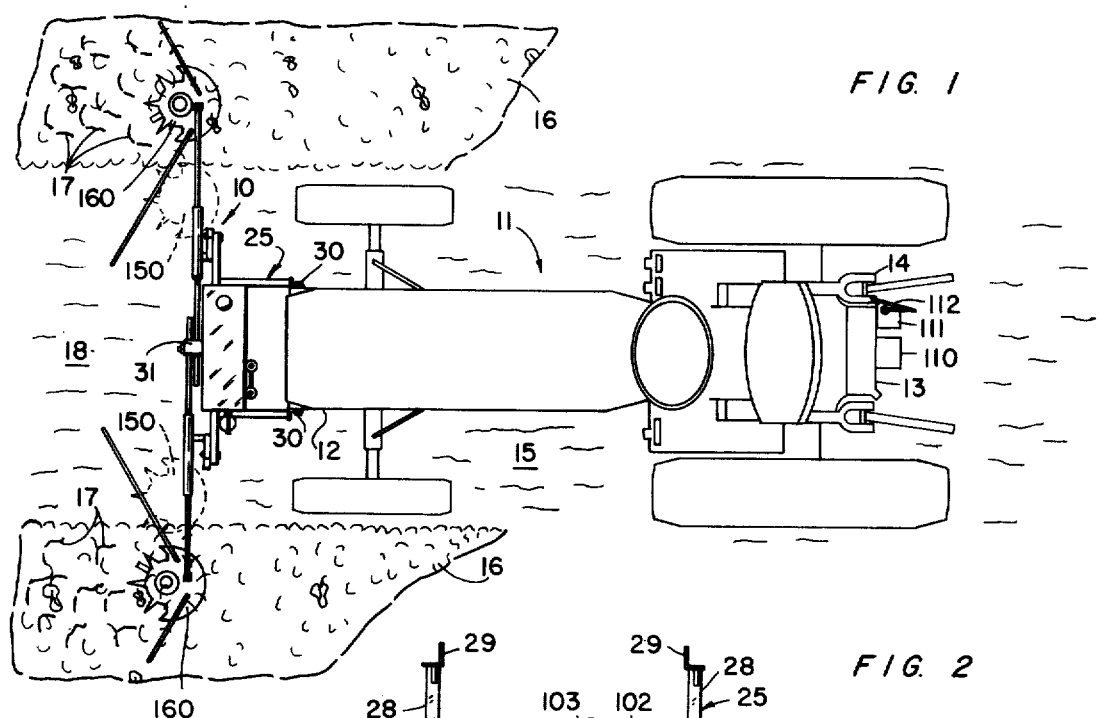
FIG. 1 is a top plan view of the implement of the present invention mounted on a tractor in a typical operative environment.
Figure 2:
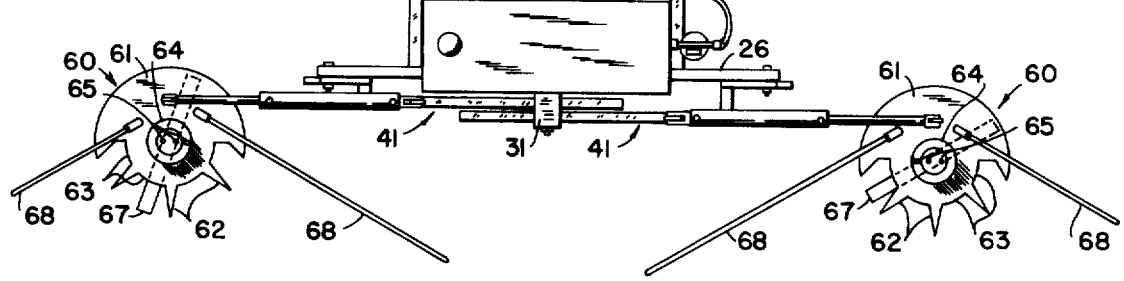
FIG. 2 is a top plan view of the implement.
Figure 3:
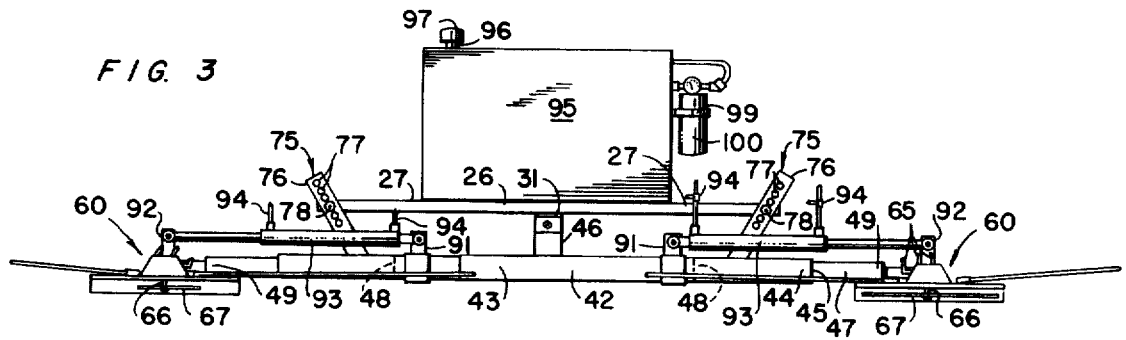
FIG. 3 is a somewhat enlarged front elevation of the implement.
Figure 4:
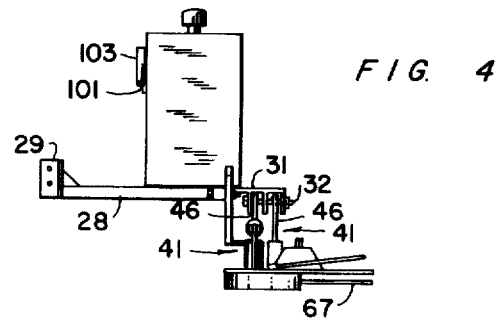
FIG. 4 is a side elevation of the implement.

Referring more particularly to the drawings, the self-acting implement of the present invention is generally indicated by the numeral 10 in FIG. 1. As shown in FIG. 1 the implement is mounted on a conventional tractor 11 having a forward portion 12 and a rearward portion 13, with respect to the normal direction of travel. As will become apparent, the implement can be mounted on any suitable vehicle, although a conventional tractor is, perhaps, the most convenient device. The tractor 11 has a work performing system including a tool bar or hydraulic mounting assembly 14 powered, in the conventional manner, for movement between a raised, inoperative position or attitude and a lowered, operative, work position or attitude. The assembly is adapted to mount a conventional earthworking tool, not shown, such as a disc, plow or the like for elevational adjustment using the mounting assembly 14.

The earth surface is indicated at 15 in FIG. 1 and a pair of rows of grapevines are indicated at 16. The rows have outwardly and downwardly extending canes 17 which the self-activating implement of the present invention is adapted to sever. The tractor 11, during normal use, traverses a path 18 between the rows.

The implement 10 has a rigid metal frame 25 of sufficient strength for the secure support of the operative components of the implement on the forward portion 12 of the tractor 11. The frame has a cross member 26 having opposite end portions 27. A pair of mounting arms 28 are secured, as by welding, on the cross member in spaced, substantially parallel relation and at right angles to the cross member. The arms have mounting brackets 29 individually affixed on the remote ends thereof and disposed substantially in right angular relation to the arms. Suitable bolt and nut assemblies 30 are employed to secure the mounting brackets 29 on the forward portion 12 of the tractor 11 in supporting relation to the frame. The frame is thus mounted in position so that the cross member 26 extends substantially transversely of the normal direction of travel of the tractor. An arm mounting assembly 31 is borne by the cross member substantially centrally thereof and beneath the cross member. The arm mounting assembly is preferably substantially aligned with the longitudinal axis of the tractor. A shaft 32 is secured on the arm mounting assembly substantially aligned with the longitudinal axis of the tractor.

A pair of arm assemblies 41 is pivotally mounted on the shaft 32. The arm assemblies of the pair individually extend in opposite directions from the shaft outwardly in the direction of their respective adjacent opposite end portions 27 of the cross member 26. Each of the arm assemblies 41 has an arm member 42, preferably constructed of square tubing, with an inner end 43 and an outer end 44. The arm member has an internal passage 45 extending therethrough interconnecting the inner and outer ends of the arm member. A mounting flange 46 is fastened on the inner end 43 of the arm member and is pivotally mounted on the shaft 32. Thus, each arm member and arm assembly are mounted for pivotal movement on the shaft along a substantially vertical path of travel beneath the cross member 26 of the frame 25.

A slide member 47 is slidably received within the internal passage 45 of the arm member 42 of each arm assembly 41. The slide member has inner and outer ends 48 and 49 respectively.

The self-acting implement 10 has a pair of work performing heads or cutters or cutting heads 60 individually borne by the outer ends 49 of the arm assemblies 41. Each cutting head has a housing 61 which is affixed on its respective outer end 49 of the slide member 47. Each housing has a plurality of forwardly extending fingers 62 disposed in spaced relation to define entrance openings 63 for the housing 61. An hydraulic motor 64 is secured on each housing and has hydraulic hose connections 65. Each motor mounts a drive shaft 66 which extends downwardly through the housing to define an axis of rotation substantially normal to the housing. A rotary cutting blade 67 is affixed on the drive shaft for rotation in a circular or rotary path of travel within the housing. A pair of flexible rods 68 is secured on each cutting head. The rods of each cutting head diverge therefrom on opposite sides of the entrance openings of the housing and in feeding relation thereto.

Each arm assembly 41 is suspended from the frame, in spaced relation to the arm mounting assembly 31, by an adjustment linkage 75. Each adjustment linkage has a bar 76 having a plurality of holes 77 extending therethrough and aligned longitudinally of the bar. A pair of bolt and nut assemblies 78 individually secure the bar 76 at one end on the adjacent opposite end portion 27 of the cross member 26 of the frame 25 and at the other end on the arm member 42 of that arm assembly. By selective extension of the bolt and nut assemblies through the holes 77, the vertical position of each arm assembly and thus the cutting position of each cutting head 60 in its respective vertical path of travel can be selected.

Figure 5:
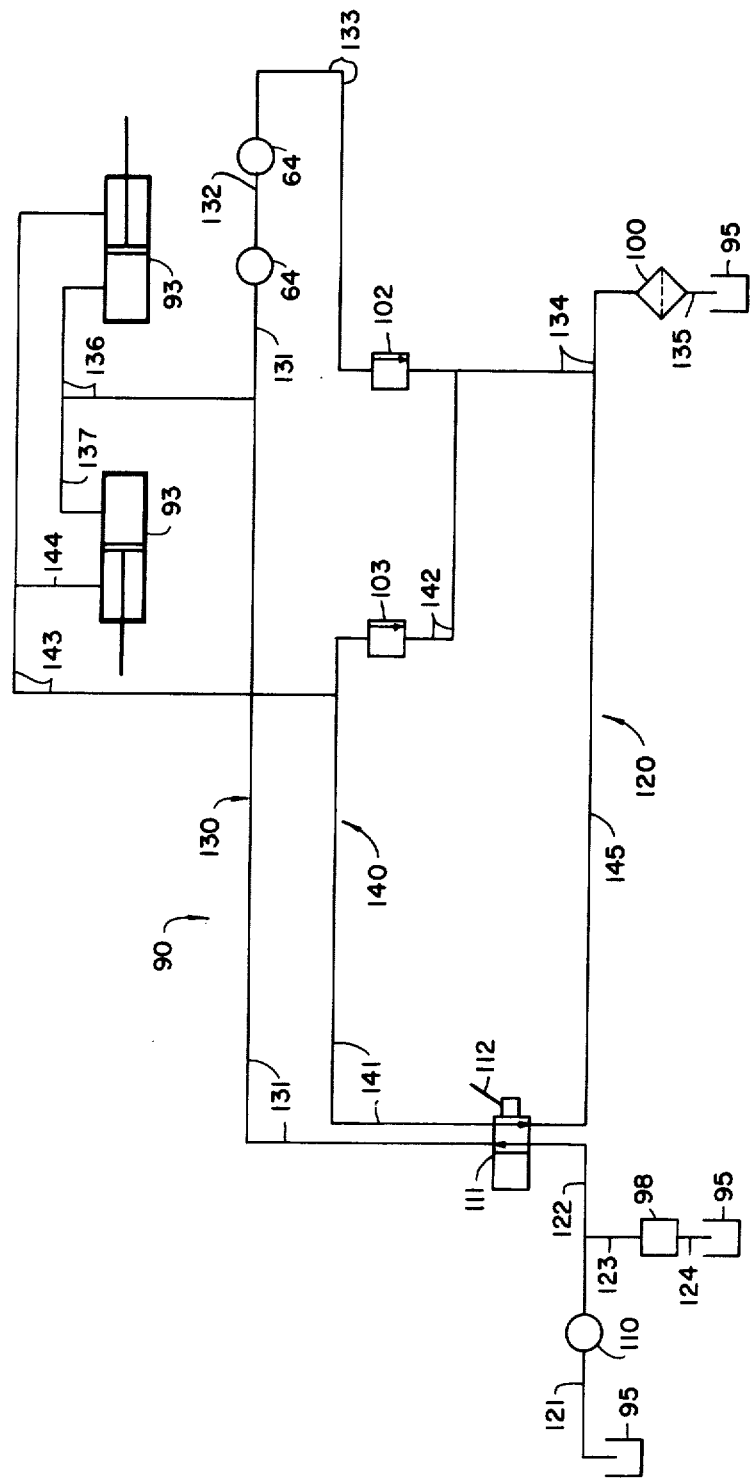
FIG. 5 is a schematic diagram of the hydraulic control system of the implement.

The implement 10 has an pressure or hydraulic control system 90 which is shown in the schematic diagram of FIG. 5. The hydraulic control system includes a pair of cylinder mounts 91 one of which is secured on the member 42 of each arm assembly 41 adjacent to the inner end 43 thereof. A cylinder mount 92 is fastened in upstanding relation on the housing 61 of each cutting head 60. An hydraulic ram or cylinder 93 operably interconnects the cylinder mounts 91 and 92 of each arm assembly 41. Each cylinder is operable to extend and retract its respective arm assembly telescopically by sliding the slide member 47 within the internal passage 45 of its respective arm member 42. Each hydraulic cylinder is of conventional construction having a pair of hydraulic hose or conduit connections 94 and an internal piston, not shown.

An hydraulic reservoir 95 is mounted on the cross member 26 of the frame 25 and has a filler tube 96. A cap 97 is removably received on the filler tube. A normally closed hydraulic pressure relief valve 98 is fastened on the reservoir. A filter mount 99 is affixed on the reservoir in supporting relation to an hydraulic filter 100. A valve mount 101 is secured, as by welding, on the hydraulic reservoir at any suitable location. A first normally closed sequence valve 102 and a second normally closed sequence valve 103 are individually secured on the valve mount 101 preferably in side-by-side relation. These normally closed valves each operate to open in response to the creation of a predetermined fluid pressure within the system on the upstream side thereof. A pressure of six hundred pounds per square inch of hydraulic fluid pressure has been found well suited for this purpose.

A fixed displacement hydraulic pump 110 is mounted on the tractor 11 in driven engagement with the power take-off shaft, not shown, of the tractor. A variable volume pressure compensated pump can be used in place of the fixed displacement hydraulic pump if desired. A main hydraulic control valve 111 is borne by the rearward portion 13 of the tractor 11. A control linkage 112 operably interconnects the control valve 111 and the hydraulic mounting assembly 14 of the tractor. The interconnection is such that raising and lowering of the hydraulic mounting assembly 14 operates the main hydraulic control valve, as will hereinafter be described, to direct hydraulic fluid through the hydraulic control system 90. Thus, such raising and lowering operates as the stimulus detectable by the implement 10 to initiate its operation.

The hydraulic control system 90 has an hydraulic circuit 120 shown in FIG. 5. The hydraulic circuit includes an hydraulic conduit 121 interconnecting the hydraulic reservoir 95 and the hydraulic pump 110 in fluid supplying relation to the pump. An hydraulic conduit 122 operably interconnects the pump 110 and the main hydraulic control valve 111 in fluid supplying relation. An hydraulic conduit 123 interconnects conduit 122 and the hydraulic relief valve 98. A hydraulic conduit 124 interconnects the relief valve 98 and the reservoir. It will be seen that when the fluid pressure within the system 90 reaches a predetermined upper limit, the relief valve opens to discharge hydraulic fluid from the circuit 120 back into the reservoir. Thus, the pressure extreme is relieved and a pressure build up beyond the predetermined upper limit is precluded.

The hydraulic circuit 120 has a first subsystem 130 which forms an operative part of the circuit and interconnects the control valve 111 and the hydraulic cylinders 93, hydraulic motors 64 and the first sequence valve 102, as will hereinafter be described. The first subsystem has an hydraulic conduit 131 which operably interconnects the control valve 111 and the hydraulic motor 64 of one of the cutting heads 60. An hydraulic conduit 132 operably interconnects that hydraulic motor 64 and the hydraulic motor 64 of the other cutting head 60. An hydraulic conduit 133 interconnects the last hydraulic motor 64 and the first sequence valve 102. Thus, it will be seen that the hydraulic motors 64 of the cutting heads are linked in the subsystem in series relation to the sequence valve 102. An hydraulic conduit 134 interconnects the sequence valve 102 and the hydraulic filter 100. Hydraulic conduit 135 interconnects the hydraulic filter and the hydraulic reservoir for discharge of the hydraulic fluid back into the reservoir. Hydraulic conduit 136 interconnects conduit 131 and the conduit connection 94 of one of the hydraulic cylinders 93 through which fluid is pumped to cause extension of the cylinder. Hydraulic conduit 137 interconnects conduit 136 and the connection 94 of the other hydraulic cylinder through which fluid is pumped to cause extension of that cylinder. Thus, it will be seen that the hydraulic cylinders 93 are connected to the conduit 131 in parallel relation.

The hydraulic circuit 120 has a second subsystem 140. The second subsystem has an hydraulic conduit 141 which interconnects the control valve 111 and the second sequence valve 103. Hydraulic conduit 142 interconnects the second sequence valve 103 and conduit 134 of the first subsystem 130 on the downstream side of sequence valve 102. Hydraulic conduit 143 interconnects conduit 141 and the conduit connection 94 of one of the hydraulic cylinders 93 through which fluid is pumped to cause contraction of that cylinder. Conduit 144 interconnects conduit 143 and the conduit connection through which fluid is pumped to cause contraction of that cylinder. Thus, it will be seen that the hydraulic cylinders 93 are linked in parallel relation in the second subsystem. A hydraulic conduit 145 interconnects the control valve 111 and conduit 134 of the first subsystem.

OPERATION

The operation of the described embodiment of the subject invention is believed to be clearly apparent and is briefly summarized at this point. During normal use, the self-acting implement 10 is mounted on the forward portion 12 of the tractor 11, as previously described and as shown in FIG. 1. The elevation of the cutting heads 60 above the earth surface 15 is adjusted using the adjustment linkages 75, as previously described. When the mounting assembly 14 of the tractor is in the raised position, the control valve, as operated by the control linkage 112, maintains the cutting heads of the implement 10 in the retracted positions indicated at 150 in phantom lines in FIG. 1.

A conventional earthworking tool, not shown, can be mounted on the hydraulic mounting assembly 14. Although such a tool need not necessarily be borne by the mounting assembly during normal use of the implement 10, the implement is intended to be used in this way. This permits the operator of the tractor to perform two work operations simultaneously thereby insuring the most efficient use of the equipment and saving considerable time.

With the self-acting implement 10 mounted and arranged as shown and described herein and with the control linkage 112 interconnecting the main control valve 111 and the mounting assembly 14, the tractor 11 is simply driven down the path 18 between the rows of grapevines 16. The tractor is operated in the normal manner to lower the tool borne by the mounting assembly into ground engagement for the particular work operation to be performed. The only action necessary by the operator with respect to implement 10 is simply to actuate the power take-off shaft of the tractor to drive the pump 110.

As previously noted, lowering of the mounting assembly to the lowered position causes the control valve 111 to be operated by the action of the linkage 112. When this occurs, the pump forces hydraulic fluid from the hydraulic reservoir 95 and through the control valve. The control valve directs the fluid through the first subsystem 130 shutting off the second subsystem 140. Since the first sequence valve 102 is closed and the conduits 131, 132 and 133 are at virtually all times substantially filled with hydraulic fluid, continued operation of the pump increases fluid pressure within the first subsystem, but does not operate the hydraulic motors 64 since there is no fluid movement therethrough. However, pressurization of conduits 136 and 137 of the first subsystem causes the hydraulic cylinders 93 simultaneously to be expanded. The hydraulic fluid within the portions of the cylinders being compressed is forced outwardly from the cylinders along hydraulic conduits 143, 144, 141 through the control valve 111, hydraulic conduits 145 and 134, the hydraulic filter 100 and back into the hydraulic reservoir 95 through hydraulic conduit 135.

When the hydraulic cylinders 93 have reached their fully expanded or extended conditions, continued operation of the pump and the lack of ability in the subsystem to expand further to accommodate the resulting increase in pressure rapidly brings the fluid pressure within the first subsystem 130 to the predetermined upper limit at which the first sequence valve 102 opens. As previously indicated an upper limit of approximately 600 pounds per square inch has been found well suited to this purpose. Opening of the sequence valve 102 and continued operation of the hydraulic pump 110 causes a continuous flow of hydraulic fluid through the first subsystem and back into the hydraulic reservoir through hydraulic conduit 135. The flow of fluid through the hydraulic motors 64 of the cutting head 60 drives the motors and their respective cutting blades. Continued pressurization of the first subsystem maintains the hydraulic cylinders in their expanded conditions.

Thus operation of the hydraulic control system 90 is initiated solely by the operator of the tractor 11 lowering the hydraulic mounting assembly 14 to the lowered position and actuating the power take off shaft of the tractor to drive the pump 110. It will be seen that this requires little more attention than is required to use the earthworking tool borne by the hydraulic mounting assembly 14 alone. It will be seen that since there is no fluid flow along hydraulic conduits 131, 132 and 133 until hydraulic cylinders 93 are substantially fully expanded, the sequence of operation is controlled. When the mounting assembly 14 is lowered, the cutting heads are first simultaneously moved to their extended cutting positions 160 in cane cutting relation to their individual rows 16 and subsequently the cutting heads are operated to cut the canes during movement of the tractor 11 along the path. The cutting blades 67 are thus prevented from rotating during movement of the cutting heads to the extended positions thereby operating to minimize the risk of inadvertent injury to field workers, crops, equipment and the like.

Once the cutting operation is begun the operator simply maneuvers the tractor 11 along the path 18 in the conventional manner performing both work operations at the same time. When the end of the path 18 has been reached, the operator of the tractor lifts the hydraulic mounting assembly 14 to the raised position, as is done in conventional practice to raise the earthworking tool out of earth engagement and for maneuvering of the tractor into the next path.

Raising of the mounting assembly 14 operates the main control valve 111 by way of the linkage 112. The control valve then shuts off the flow of hydraulic fluid through the fluid first subsystem 130 and instead directs the hydraulic fluid pumped by the pump 110 through the second subsystem 140. Termination of fluid flow through the first subsystem stops operation of the hydraulic motors 64 and thus the cutting heads. As with sequence valve 102, the second sequence valve 103, being normally closed, prevents the flow of hydraulic fluid therethrough. Thus, as the second subsystem is pressurized, hydraulic fluid is pumped along hydraulic conduits 143 and 144 to the hydraulic cylinders 93 causing them simultaneously to be contracted. The hydraulic fluid contained in the hydraulic cylinders on the expansion sides thereof is forced from the cylinders in the reverse direction through the first subsystem 130. Thus the fluid is forced along hydraulic conduits 136, 137 and 131 in the reverse direction through the control valve 111, along hydraulic conduit 145, the hydraulic filter 100 and hydraulic conduit 135 back into the reservoir 95. The first sequence valve 102 remains closed to prevent fluid flow through the hydraulic motors 64. The second sequence valve 103 operates to open when the hydraulic cylinders have been fully contracted so as to permit the hydraulic pump 110 to continue to operate for immediate use and to avoid the build up of fluid pressure within the system. Thus, the hydraulic control system is available to operate instantaneously to expand the hydraulic cylinders when the operator of the tractor again lowers the hydraulic mounting assembly 14 of the tractor.

It will be seen that the implement of the present invention permits the operator of a tractor simultaneously to perform two or more work operations with little or no additional difficulty. The implement is fully adaptable for mounting on virtually any vehicle. Similarly, other work performing units can be employed in place of the cutting heads 60, these units being shown and described herein both because of their unique characteristics in the device of the present invention as well as for illustrative convenience. The rods 68 operate, during movement of the tractor along the path 18, to feed canes into the cutting heads for efficient cutting.

Therefore, the implement of the present invention is adapted for self-acting operation during normal conventional use of a tractor in a manner which permits the cutting of the canes of such vine crops as grapevines from a pair of adjacent rows simultaneously, operating only during passage along the path between the rows and minimizing the risk of injury to field workers, crops, equipment and the like so as to maximize the efficiency, safety and dependability with which such farming operations can be performed.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An implement adapted to be borne by a vehicle in earth traversing movement substantially parallel to a crop wherein the vehicle mounts a bar for connection to an earthworking tool and said bar is movable between a lowered position and a position elevated therefrom, the implement comprising a work performing head; means mounting the head for movement to and from a work performing position; and control means connected to said mounting means for moving the head to and from the work performing position in response to a predetermined stimulus and said control means of the implement including a sensor operable individually to register when said bar is in the respective positions thereof and to provide said predetermined stimulus for moving the head of the implement to and from the work performing position in response thereto.

2. An implement for cutting canes and the like of a row crop, the implement comprising a frame adapted to be mounted on the forward portion of a vehicle for movement along a path of travel substantially parallel to said row crop wherein said vehicle has a tool mounting assembly movable between lowered and raised positions; an arm borne by the frame and composed of portions telescopically adjustable for extension and contraction of the arms along a second path of travel extending laterally of said first path of travel in the direction of the row crop; a cutting head borne by a portion of the arm having a rotary cutting blade driven by a motor; a ram interconnecting the portions of the arm and operable to cause said extension and contraction; control means connected to the ram and motor for operation of the ram for extension of the arm to position the cutting head for cutting the canes and for operation of the motor to rotate the cutting blade to cut the canes, wherein the control means is an hydraulic system having a pump operable to pressurize the system, a first subsystem interconnecting the pump, the ram for extension thereof and the motor, a second subsystem interconnecting the pump and the ram for contraction thereof, and a control valve connected to the system between the pump and the subsystems for selective alternate pressurization of said subsystems during operation of the pump; and a linkage operably interconnecting the tool mounting assembly and the control valve for said pressurization of the first subsystem upon movement of the tool mounting assembly to the lowered position and alternatively pressurization of the second subsystem upon movement of the tool mounting assembly to the raised position.

3. The implement of claim 2 wherein the hydraulic system contains fluid and said pump is operable to pump the fluid in a predetermined direction through the first subsystem and a sequence valve is mounted in communication with the first subsystem down stream with respect to said predetermined direction from the motor and the sequence valve is normally closed preventing fluid flow through the motor and is operable, upon pressure in the first subsystem reaching a predetermined upper limit attainable only upon the ram substantially fully extending the arm along said second path, to open permitting fluid to flow through the motor to rotate the cutting blade.

4. In combination with a tractor or the like adapted for earth traversing movement and having a forward portion and a rearward portion mounting a tool bar for elevational movement between a lowered position to dispose a tool borne thereby in earth engagement and a raised position, an implement for cutting canes or the like from a row crop along which the tractor is moved in said earth traversing movement comprising a frame adapted to be mounted on the forward portion of the tractor; an arm, having a remote portion, mounted on the frame for movement of said remote portion laterally of the tractor to and from the row crop; and hydraulic cylinder borne by the arm for expansion and contraction to cause said movement of the remote portion; a cane cutter borne by the remote portion of the arm; and hydraulic motor secured in driving relation to the cane cutter; an hydraulic control valve mounted on the tractor for operation by the tool bar of the tractor when it is moved between said raised and lowered positions; and hydraulic control means interconnecting the hydraulic control valve, hydraulic cylinder and hydraulic motor for expansion of the hydraulic cylinder and driving of the hydraulic motor when the tool bar is moved to the lowered position to move the cane cutter to the row crop and operate said cutter and alternately for contraction of the hydraulic cylinder and terminating operation of the hydraulic motor when the tool bar is moved to the raised position to move the cane cutter from the row crop and terminate operation of the cutter.

5. The implement of claim 4 wherein said hydraulic control means operates by the passage of hydraulic fluid therethrough and the control means has a sequence valve which opens only at a predetermined pressure, said hydraulic motor operates only upon passage of fluid therethrough, and said hydraulic cylinder, hydraulic motor and sequence valve are linked in series relation and in that order whereby upon operation of the control valve by movement of the tool bar to the lowered position the sequence valve opens only when the hydraulic cylinder is substantially fully expanded and the hydraulic motor operates only when the sequence valve is opened.

6. An implement for cutting canes and the like of a row crop while being borne by a vehicle, having a selectively operable work performing system individual thereto, along a path of travel substantially parallel to said row crop, the implement comprising a cutting head; means for mounting the cutting head on the vehicle for movement along a path to and from an extended cutting position; means for moving the cutting head along said path; and control means operatively interconnecting the work performing system of the vehicle and the moving means of the implement for operating said moving means of the implement in response to operation of the work performing system of the vehicle.

7. The implement of claim 6 wherein said work performing system of the vehicle has a tool bar positionable in a work position and the control means of the implement is operably linked to the work performing system whereby the cutting head of the implement is moved to the cutting position when the tool bar of the work performing system is moved to said work position.

8. The implement of claim 6 wherein said moving means includes an hydraulic ram operable to move the cutting head to and from the cutting position, the cutting head is driven by an hydraulic motor and said hydraulic ram and hydralic motor are interconnected in series relation by an hydraulic system having a normally closed valve downstream from said ram and mtor and operable to open upon a predetermined fluid pressure being reached upon movement of the cutting head to the cutting position whereby said motor operates substantially only upon the cutting head reaching said cutting position.

9. The implement of claim 6 wherein the implement has a pair of cutting heads, the mounting means is adapted to mount the cutting heads for movement along paths to and from individual extended cutting positions on opposite sides of the vehicle, the moving means is operable to move the cutting heads along said paths and the control means operates the moving means to move both of the cutting heads along said paths in response to operation of the work performing system of the vehicle.

10. An implement adapted to be borne by a vehicle in earth traversing movement substantially parallel to a row crop wherein said vehicle mounts a tool positionable in alternative operative and inoperative attitudes, the implement comprising a work performing head; means for mounting the work performing head on said vehicle for movement along a path toward and from the row crop during said earth traversing movement; a pressure system for moving said work performing head along said path; and means linking the pressure system and the vehicle for operating the pressure system to move the head toward the row crop along said path upon positioning of the tool in said operative attitude and for operating the pressure system to move the head from the row crop along said path upon positioning of the tool in said inoperative attitude.

* * * * *